Oct. 6, 1931.          P. E. HAWKINSON          1,826,073
                          TIRE PATCH
                  Original Filed Aug. 25, 1925
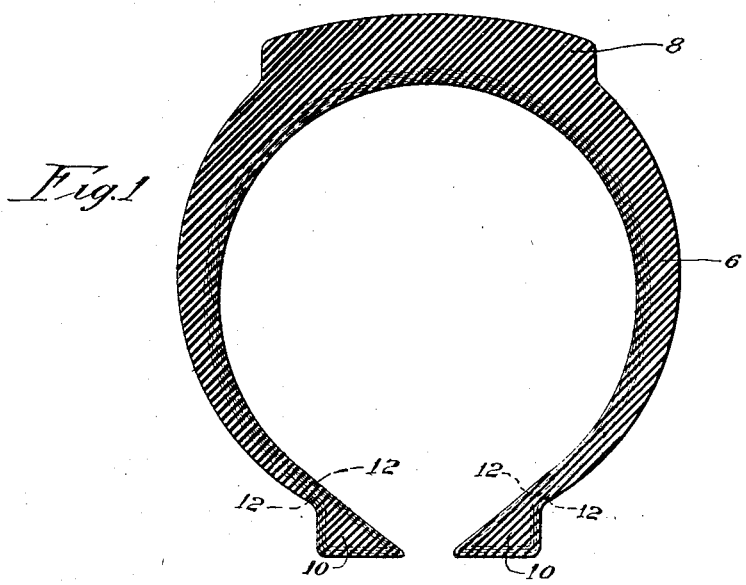
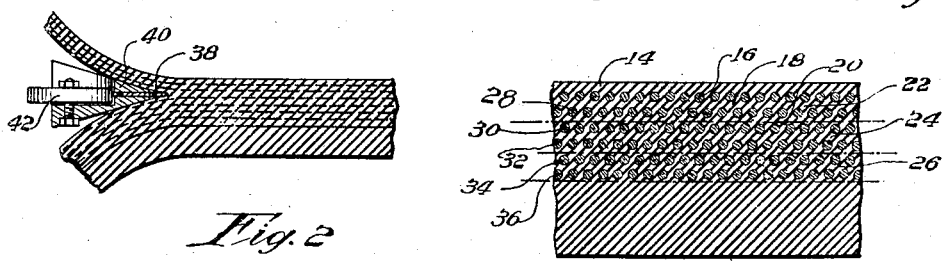
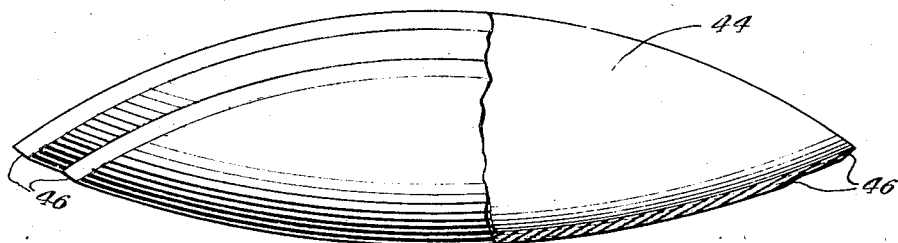
Inventor:
Paul E. Hawkinson
By: Williams, Bradbury,
McCaleb & Hinkle
Attorneys.

Patented Oct. 6, 1931

1,826,073

UNITED STATES PATENT OFFICE

PAUL E. HAWKINSON, OF MINNEAPOLIS, MINNESOTA, ASSIGNOR TO KEHAWKE MANUFACTURING CO., OF MINNEAPOLIS, MINNESOTA, A CORPORATION OF MINNESOTA

TIRE PATCH

Original application filed August 25, 1925, Serial No. 52,474. Patent No. 1,697,955, dated January 8, 1929. Divided and this application filed December 16, 1927. Serial No. 240,353.

My invention relates to an improved tire patch and is an improvement upon the invention set forth in my Patent No. 1,436,394 dated November 21, 1922.

This application is a division of my co-pending application, Serial No. 52,474, filed August 25, 1925, which matured into Patent No. 1,697,955, granted January 8, 1929, in which the method of making the herein described patch is claimed. The machine by which the present patch is made is fully disclosed and claimed in my Patent No. 1,759,507, granted May 20, 1930, which was issued on an application which was also a division of said application Serial No. 52,474.

In the usual method heretofore employed in making patches for repairing pneumatic tire casings, as set forth in my above mentioned patent, it has been the practice to strip or pull the desired number of plies or layers of fabric and interposed rubber from the carcass of a used tire; cut the removed layers or plies to the desired shape (usually round) and then skive the edge so that a neat or flat joint may be made with the casing of the tire to be repaired. When the plies for patch material are removed from the tire carcass in this manner, the separation is usually uneven, the interposed layer of rubber adhering in places to the surface of the removed plies and in other places to the remaining carcass. The surfaces of the patch material are therefore apt to be uneven, covered with a layer of rubber in some portions and substantially free of rubber in other portions. Because of this uneven cleavage when the pulling method of separation is employed, it has been the practice to buff the surfaces of the patch material to remove any traces of the rubber layer adhering thereto and to thereby give the surfaces a uniform exposure of fabric. Unless the buffing of this surplus rubber from the surfaces of the patch is very carefully done the fabric is apt to become loosened and parts thereof removed, thus reducing its strength to some extent. The use of such fabric faced patches in repairing tires according to the method set forth in my previously mentioned patent ordinarily requires that, before the patch is placed one or both of its fabric faces be covered or coated with a thin layer of gum rubber or similar material. These extra steps of removing the uneven layer of original rubber and then applying the thin and uniform coating of new rubber adds to the labor and expense of making the patches. Furthermore, this application of uncured rubber to the surfaces of the patch material does not always produce a thorough union between the rubber and the buffed fabric, such, for example, as exists between the layers of fabric and vulcanized rubber of a tire casing. It has also been found that, in pulling the patch material from the carcass, the fabric at the plane of cleavage is oftentimes injured because of the tendency to deform and tear the fabric and to stretch and displace the strands of which it is composed.

The principal object of my present invention is to provide a patch having the same general type and characteristics of that disclosed in my previously mentioned patent, but which is covered on either or both of its surfaces with a thin and uniform layer of the original interposed layer of vulcanized rubber.

I prefer to take the patch material from used tires because the plies are firmly welded or cemented together, all of the stretch has been removed from the fabric so that the patch will remain in position and will not bulge, the material is formed to the shape of the tire to be repaired, and furthermore the materials ordinarily used in tire manufacture are of a better grade and quality than can be obtained upon the market merely for tire repair purposes.

A further object is to provide an improved tire patch, which is strong, properly shaped and which may be economically manufactured.

Other objects will appear from the following description in which:

Figure 1 is a section of a used tire casing showing the portion thereof which is used in making my improved patch.

Figures 2 and 3 are enlarged sections to different scales of portions of the casing showing how the patch material is cut from the used tire casing.

Figure 4 is a side elevation of my improved patch, part thereof being shown in section.

According to the method of making my improved patch which is fully disclosed in my aforesaid co-pending application, a used tire casing 6 having the usual tread portion 8 and beads 10 is flattened out and the bead portions cut off along the lines 12—12 shown in Figure 1. The casing is also transversely severed so as to form a single strip. The casing, of course, comprises alternate layers of fabric cord and rubber. The structure is best illustrated in Figure 3 where reference character 14 indicates the innermost layer of rubber; 16, the innermost layer of fabric; 18, 20, 22, 24, 26, intermediate layers of rubber; and 28, 30, 32, 34 and 36, the layers or plies of the cord fabric.

As has been above pointed out, it is highly desirable to obtain a patch having its external surfaces covered with layers of the original rubber of the casing. To accomplish this purpose the patching material is made by cutting through the intermediate layers of rubber. By performing this operation properly the cut may be made through the center of this intermediate layer of rubber, thus leaving the adjacent plies of fabric covered with their original rubber.

In Figure 2, I have diagrammatically illustrated the method by which the tire patching material is severed from the tire casing. An endless band knife 38 is guided in a wedge-shaped member 40 and held against transverse movement by a plurality of rollers 42 which are suitably mounted on the guide member 40. The knife 38 is moved continuously in one direction in cutting through the rubber layer and the casing fed to the knife. The knife is quite blunt and sufficiently flexible, and the mounting therefor permits sufficient play so that the knife will follow a substantially median plane through the rubber layer and not cut into the fabric. This is highly desirable since it is found that the cut cannot be made with mathematical exactitude because of the irregularities in the distance of the plies of fabric from the inner surface of a tire casing. If a rigid knife is rigidly guided and set to cut a certain distance from the surface of the inside of the tire casing (when flattened out) the knife would cut through portions of the fabric as well as through portions of the rubber due to the above-mentioned variations in the distance between the cord fabric and the inner surface of the tire casing.

In Figure 2, the knife is shown as taking a cut of two plies from a used tire casing and in Figure 3 the dot and dash lines indicate the cuts which may be taken to provide three pieces of tire patching material from a casing having six plies of fabric. If desired, the patches may be made more than two plies thick, or in certain instances a patch one ply thick may be cut from the casing. The knife 38 is fairly blunt so that it leaves the rubber very slightly roughened in the condition which is most desirable for the adhesion of the patch, and the surfaces of the patching material, therefore, do not require any additional treatment. The condition of the rubber surface may be described as being a dull finish, that is, it is not a glazed surface, but, as a whole, is comparatively smooth.

While the patching material thus severed from the tire casing may be cut into various shapes and used in any manner desired, I prefer to form patches of graduated size and circular in form, as described in my above-mentioned patent.

In Figure 4, I have shown such a patch 44 in elevation. It will be noted that the outer edge surfaces have been skived at 46. By complementally skiving the internal surfaces of the casing to be repaired with the patch, a strong and smooth patch is obtained. By making the patches of circular form and standard dimensions, the patches may be prepared in advance and applied to the casings which have been prepared to receive standard sized patches.

While I have shown and described a particular embodiment of my invention, I do not wish my invention to be limited to the specific features thereof since various modifications thereof may be made without departure from the principles herein disclosed. I therefore desire the scope of my invention to be limited only by the claim which follows.

I claim:

As a new article of manufacture, a tire repair sheet or shoe formed from an old tire casing and comprising a plurality of fabric plies united by vulcanized rubber and provided on its convex side with a vulcanized rubber film filling the spaces between the threads of the outer fabric ply and forming a surface that is relatively smooth and uniform as characterized by being cut from the tire casing, substantially as described.

In witness whereof, I hereunto subscribe my name this 13th day of December, 1927.

PAUL E. HAWKINSON.